United States Patent Office 3,391,196
Patented July 2, 1968

3,391,196
HIGH EQUIVALENT WEIGHT HYDROXY-TERMINATED ETHYLENE OXIDE-BUTYLENE OXIDE POLYETHER POLYOLS
Mason H. Earing, Danville, Ill., and John T. Patton, Jr., Wyandotte, Mich., assignors to Wyandotte Chemicals Corporation, Wyandotte, Mich., a corporation of Michigan
No Drawing. Filed Aug. 16, 1965, Ser. No. 480,110
3 Claims. (Cl. 260—615)

ABSTRACT OF THE DISCLOSURE

High equivalent weight hydroxy-terminated polyether polyols are prepared by the reaction of a polyhydric alcohol with certain mixtures of ethylene oxide and butylene oxide. The polyols are substantially free of unsaturated moieties and are particularly useful in the preparation of polyurethane compositions.

---

This invention relates to novel hydroxy-terminated polyether polyols. More particularly, this invention relates to novel high equivalent weight hydroxy-terminated polyether polyols substantially free of unsaturated moieties and to a process for the preparation thereof.

Hydroxy-terminated polyether polyols are extensively employed in the preparation of numerous polymer compositions, particularly polyurethane and polyester compositions. Depending upon the desired results, polyether polyols of various equivalent weights may be so employed. Low equivalent weight polyols are readily prepared and frequently employed in polymer preparation. The same is not so of high equivalent weight hydroxy-terminated polyether polyols for several reasons. One reason may be attributed to the difficulties encountered in preparing these polyols. Generally, when it is desired to prepare a high equivalent weight hydroxy-terminated polyether polyol, for example a 3000 equivalent weight hydroxy-terminated polypropylene glycol, the buildup in the amount of unsaturated moieties resulting from the rearrangement of propylene oxide to allyl alcohol severely limits the equivalent weight which may be obtained in the polymerization. As a result, hydroxy-terminated polypropylene glycols with equivalent weights greater than 1500 are extremely difficult to prepare.

Another reason why high equivalent weight hydroxy-terminated polyether polyols have not found general application in polymer preparation is that when prepared they have been found to contain a high proportion of unsaturated moieties. These moieties are monofunctional with respect to the number of hydroxyl groups per molecule and, therefore, act as a chain-terminating agent in the production of polymers, thereby severely limiting the physical properties (tensile, tear and elongation) of the polymer.

Now, in accordance with this invention, novel high equivalent weight hydroxy-terminated polyether polyols substantially free of unsaturated moieties are prepared which may be satisfactorily employed in polymer preparation, particularly polyurethane preparation. The novel polyether polyols of this invention are prepared by the reaction of a mixture of ethylene oxide and butylene oxide with an organic compound having at least two active hydrogen atoms. The polyether polyols of this invention have an equivalent weight of from about 3400 to about 8000, or higher, and contain from about 10% to about 75%, preferably 50% to 75%, by weight of ethylene oxide.

As used herein, equivalent weight is the molecular weight of the polyether polyol per hydroxyl group. The molecular weights of the polyols are calculated from their hydroxyl numbers according to the formula:

$$\text{Molecular weight} = \frac{56.1 \times 1000 \times \text{no. of hydroxyl groups/molecule}}{\text{hydroxyl number}}$$

The hydroxyl numbers of the polyols are calculated in accordance with ASTM D-1638.

Numerous organic compounds having at least two active hydrogen atoms may be employed in the preparation of the polyols of this invention. Preferred compounds are polyhydric alcohols. Illustrative polyhydric alcohols which may be employed include ethylene glycol, propylene glycol, the isomeric n-butylene glycols, 1,5-pentanediol, 1,6-hexanediol, glycerol, trimethylolpropane, sorbitol, sucrose, α-methylglucoside and pentaerythritol. Although it is preferred to employ polyhydric alcohols in the preparation of the polyols of this invention, other compounds having at least two active hydrogen atoms which may be employed in lieu of polyhydric alcohols include organic acids such as adipic acid, succinic acid, aconitic acid and trimellitic acid; inorganc acids such as the phosphoric acids; amines such as methyl amine, ethyl amine, ethylene diamine, diethylene triamine, piperazine and triisopropanol amine; phenolic compounds such as bisphenol, pyrogallol, resorcinol, inositol; mercaptans such as 1,2-ethanedithiol and 1,2,3-propanetrithiol, and acid amides such as acetamide and benzene sulfonamide.

The hydroxy-terminated polyether polyols of this invention are prepared by the catalytic polymerization of selected amounts of mixtures of ethylene oxide and butylene oxide with an organic compound having at least two active hydrogen atoms. Catalysts which may be employed include alkali metals such as sodium or potassium, alkali metal hydroxides such as sodium hydroxide or potassium hydroxide, and amines such as triethyl amine. Any other basic catalyst commonly used for alkylene oxide condensation reactions may also be employed.

In an example of the preparation of a polyether polyol of this invention, a polyhydric alcohol such as glycerol is placed in a reactor together with a catalyst. An oxide mixture is then incrementally introduced into the reactor and the reaction mixture is heated under pressure to about 125° C. Upon completion of the oxide addition, the mixture may be allowed to react for a few hours at a temperature of from about 100° C. to 150° C. The amount of oxide mixture employed is that which results in a product having an equivalent weight from about 3400 to about 8000 with between 10% and 75% by weight of the mixture being ethylene oxide. The polyol product may be separated from the catalyst by any well-known process such as neutralization with an acid and subsequent filtration or ion exchange.

The products of this invention are substantially free of unsaturated moieties. By this is meant the products have an unsaturation value of less than 0.1, preferably less than about 0.05 milliequivalent per gram as determined by the method set forth in ASTM D-1638.

The following examples serve to illustrate the invention. All parts are by weight unless otherwise stated.

Example I (A) A clean, dry, reaction vessel was charged with 423 parts of propylene glycol and 20 parts of potassium hydroxide. The vessel was purged with nitrogen, heated to 115° C., and a mixture of 1038 parts of ethylene oxide and 1038 parts of butylene oxide was added over a period of about twelve hours. During the addition of the oxide, the pressure gradually rose to 90 p.s.i.g. At the conclusion of the addition of the oxides, the reaction mixture was stirred for about one hour at 120° C. The reaction mixture was then neutralized, filtered, and stripped of volatile materials at 120° C. for about one hour. The product was a liquid with a hydroxyl number of 268.4, corresponding to a molecular weight of 419.

(B) Following the general procedure described in (A), a mixture of 1025 parts of ethylene oxide and 1025 parts of butylene oxide was added to 450 parts of the product prepared in (A). Again, the addition occurred over a twelve-hour period and after the addition was completed, the mixture was allowed to react for about one and one-half hours at 120° C. Separation of the product resulted in a liquid with a hydroxyl number of 52.7, corresponding to a molecular weight of 2130.

(C) Again following the procedure described in (A), a mixture of 989 parts of ethylene oxide and 989 parts of butylene oxide was added to 522 parts of the product prepared in (B). The time of addition and subsequent reaction time and temperature were the same as recited above in (A). Separation of the product resulted in a liquid with a hydroxyl number of 15.8, corresponding to a molecular weight of 7108 (50% ethylene oxide), an equivalent weight of 3554, and an unsaturation value of 0.0053 milliequivalent per gram.

Example II (A) A clean, dry, reaction vessel was charged with 134 parts of trimethylolpropane and 16 parts of potassium hydroxide. The vessel was purged with nitrogen, heated to 125° C., and a mixture of 11,483 parts of ethylene oxide and 3,500 parts of butylene oxide was added over a period of about 28 hours. During the addition of the oxide, the pressure gradually rose to 90 p.s.i.g. At the conclusion of the addition of the oxides, the reaction mixture was stirred for about one hour at 125° C., neutralized, filtered, and stripped of volatile materials at 120° C. for about one hour. The product was a viscous liquid with a hydroxyl number of 14.8, corresponding to a molecular weight of 11,400 (75% ethylene oxide), an equivalent weight of 3800, and an unsaturation value of 0.003 milliequivalent per gram.

(B) Following the general procedure described in (A), a mixture of 1400 parts of ethylene oxide and 470 parts of butylene oxide was added to 630 parts of the product prepared in (A). The addition time was about twelve hours. Upon completion of the oxide addition, the mixture was allowed to react for two hours at 125° C. Separation of the product resulted in a liquid having a hydroxyl number of 7.2, corresponding to a molecular weight of 23,400 (75% ethylene oxide), an equivalent weight of 7800, and an unsaturation value of 0.004 milliequivalent per gram.

Example III

The procedure of Example II was duplicated with the exception that a mixture of 44,899 parts of butylene oxide and 14,967 parts of ethylene oxide was added to 134 parts of trimethylolpropane over a period of 48 hours. The product was a viscous liquid having a hydroxyl number of 14.5, corresponding to a molecular weight of 11,600, an equivalent weight of 3867 (25% ethylene oxide), and an unsaturation value of 0.008 milliequivalent per gram.

Example IV

Following the general procedure of Example I, a polyol was prepared by:

(A) The reaction of 460 parts of pentaerythritol with a mixture of 1020 parts of ethylene oxide and 1020 parts of butylene oxide in the presence of 50 parts of potassium hydroxide.

(B) The reaction of 500 parts of the product prepared in (A) with a mixture of 1000 parts of ethylene oxide and 1000 parts of butylene oxide.

(C) The reaction of 625 parts of the product prepared in (B) with a mixture of 937 parts of ethylene oxide and 937 parts of butylene oxide.

The total reaction time was about 34 hours. Upon completion of the oxide addition, the mixture was allowed to react in each step for an additional two hours at 125° C. The product obtained from (C) had a hydroxyl number of 14.7, corresponding to a molecular weight of 19,268 (50% ethylene oxide), an equivalent weight of 4808, and an unsaturation value of 0.0094 milliequivalent per gram.

Example V

Following the general procedure of Example I, a polyol was prepared by the following steps:

(A) The reaction of 42.3 parts of propylene glycol with a mixture of 155.7 parts of ethylene oxide and 51.9 parts of butylene oxide in the presence of two parts of potassium hydroxide.

(B) The reaction of 45 parts of the product prepared in (A) with a mixture of 163.7 parts of ethylene oxide and 41.3 parts of butylene oxide.

(C) The reaction of 52.2 parts of (B) with a mixture of 148.3 parts of ethylene oxide and 49.5 parts of butylene oxide.

Total reaction time was about 34 hours. Upon completion of the oxide addition, the mixture was allowed to react in each step for an additional two hours at 125° C. The product obtained from (C) had a hydroxyl number of 13.7, corresponding to a molecular weight of 8190 (75% ethylene oxide), an equivalent weight of 4095, and an unsaturation value of 0.0059 milliequivalent per gram.

Example VI

Following the general procedure described in Example II, a polyol was prepared by the reaction of 13.4 parts of trimethylolpropane with a mixture of 906 parts of ethylene oxide and 1480.6 parts of butylene oxide. Addition time and temperature were comparable to that of Example II. Isolation of the product resulted in a liquid having a hydroxyl number of 12.8, corresponding to a molecular weight of 13,150 (38% ethylene oxide) an equivalent weight of 4400, and an unsaturation value of 0.0090 milliequivalent per gram.

Example VII

Two polyurethane compositions were prepared, one with the product of Example I above and the other with a known polyether polyol. The known compound is generally referred to as a 4000 molecular weight (2000 equivalent weight) polypropylene glycol. This compound has an unsaturation value of about 0.1 milliequivalent per gram, which indicates that it has a considerable amount of monofunctionality.

The polyurethane compositions were prepared by reacting the polyether polyols with toluene diisocyanate in an NCO/OH ratio of about one. The composition prepared from polypropylene glycol was sticky and totally unmanageable. The physical properties of the composition could not be tested. However, the composition prepared from the polyol of Example I was easy to handle and its physical properties were tested according to standard procedures. The tests indicate that a satisfactory polyurethane was prepared.

An attempt was made to prepare a polypropylene glycol of higher equivalent weight than the one employed above. The attempt was unsuccessful. The amount of unsaturation accumulating during the polymerization prevented this preparation.

This example demonstrates that high equivalent weight hydroxy-terminated polyether polyols could not be prepared from propylene oxide whereas employing a mixture of ethylene oxide and butylene oxide as demonstrated in the previous examples allowed for the preparation of such polyether polyols. Further, this example demonstrates the superiority of polyurethane compositions prepared from the polyols of this invention over those prepared from the highest equivalent weight polypropylene glycol (the compound most similar structurally to those of this invention) preparable.

What is claimed is:

1. Hydroxy-terminated polyether polyols having an equivalent weight from about 3400 to 8000 and substantially free of unsaturated moieties, prepared by the reaction of an alkane polyol having at least two active hydrogen atoms with a mixture of ethylene oxide and butylene oxide, said mixture containing from about 10% to about 75% by weight ethylene oxide.

2. The hydroxy-terminated polyether polyols of claim 1 when the alkane polyol is propylene glycol, trimethylolpropane, or pentaerythritol.

3. The hydroxy-terminated polyether polyols of claim 1 when the ethylene oxide-butylene oxide mixture contains from 50% to 75% by weight of ethylene oxide.

References Cited

UNITED STATES PATENTS

| 2,819,220 | 1/1958 | De Groote et al. | 260—615 XR |
| 3,053,903 | 9/1962 | Holland | 260—615 |
| 3,159,591 | 12/1964 | Lanham | 260—615 |
| 3,169,934 | 2/1965 | Dennett et al. | 260—615 |
| 3,222,306 | 12/1965 | Loew | 260—615 |
| 3,255,253 | 6/1966 | Kuryla | 260—584 |

FOREIGN PATENTS

| 525,844 | 6/1956 | Canada. |

BERNARD HELFIN, *Primary Examiner.*

LEON ZITVER, *Examiner.*

H. T. MARS, *Assistant Examiner.*